United States Patent [19]
Rutty

[11] 3,905,114
[45] Sept. 16, 1975

[54] SMILEY COILABLE RULE WITH AUTOMATIC RECOIL SPEED CONTROL

[75] Inventor: Edward C. Rutty, Portland, Conn.

[73] Assignee: The Stanley Works, New Britain, Conn.

[22] Filed: Feb. 22, 1974

[21] Appl. No.: 444,818

[52] U.S. Cl. .................... 33/138; 188/83; 242/84.8
[51] Int. Cl.² ................ G01B 3/10; B65H 75/16; F16D 63/00
[58] Field of Search ............ 33/137, 138; 242/84.8; 188/83

[56] References Cited
UNITED STATES PATENTS

| | | | |
|---|---|---|---|
| 3,220,112 | 11/1965 | Quenot | 33/138 |
| 3,443,316 | 5/1969 | Edgell | 33/138 |

Primary Examiner—Richard E. Aegerter
Assistant Examiner—Steven L. Stephan
Attorney, Agent, or Firm—Prutzman, Hayes, Kalb & Chilton

[57] ABSTRACT

An automatically recoiled tape measure with a measuring blade of concavo-convex cross-section has a recoil speed control which applies a friction retarding force directly on the blade as it approaches the termination of recoil to thereby absorb the momentum of the coiled portion of the tape prior to blade hook impact on the casing. The mouth of the casing provides a specially shaped tunnel for the blade and comprises a rigid inclined guide ramp which centers the blade and generally holds the blade out of contact with a soft elastomeric deceleration ring positioned between the ramp and the front wall of the casing. Vertical and/or horizontal to-and-fro motion of the extending portion of the blade causes the blade to frictionally contact the deceleration ring and impart a braking force thereon. Vertical flexures of the blade also causes a flattening of the blade to wedge the blade.

4 Claims, 5 Drawing Figures

SMILEY COILABLE RULE WITH AUTOMATIC RECOIL SPEED CONTROL This invention relates to automatically coilable rules which utilize a coilable measuring tape and is particularly concerned with the provision of such a rule incorporating a recoil speed control for controlling the speed of recoil as the tape approaches the termination of recoil.

Spring motors used in coilable rules for the automatic recoil of measuring tapes have considerable torque, and as a result, the hook at the end of the tape normally engates the tape casing at the end of recoil with considerable impact. While recoil springs used in such rules are designed to provide a lessening torque as the recoil of the tape approaches the termination of recoil, there is a substantial amount of shock impact on the hook as it strikes the casing to suddenly absorb the momentum of the rotating convolutions of coiled tape.

The primary object of this invention is to provide a coilable rule having a speed control for controlling the speed of the tape at the end of recoil.

Another object of this invention is to provide a coilable rule having specially shaped tunnel defining a path for the tape during recoil and to impart a decelerating force on the tape prior to the termination of tape recoil. Included in this object is the provision of a deceleration ring formed of a material having a high coefficient of friction mounted in a recess within the casing for frictional engagement with the tape during recoil so as to increase the decelerating force toward the end of recoil.

A further object of this invention is to provide a coilable rule of the type described which can be economically produced and yet is highly reliable and of durable construction.

Other objects will be in part obvious and in part pointed out more in detail hereinafter.

A better understanding of the invention will be obtained from the following detailed description and the accompanying drawing of an illustrative application of the invention. In the Drawing.

Figure 1:
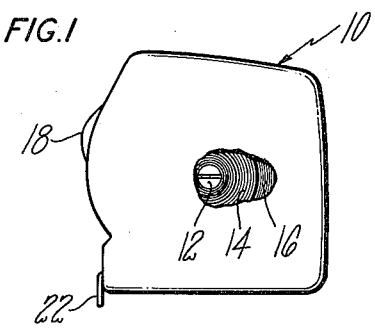
FIG. 1 is a side elevational view of a coilable rule, partly broken away, incorporating a preferred form of the present invention.

Refer now more particularly to the accompanying drawing, the coilable rule as shown comprises a two-piece molded rigid plastic casing 10 mounting a central fixed shaft 12 to which one end of a coiled spring 14, which serves as a spring motor, is fixed. The spring 14 is stressed to return the coilable measuring tape 16 into a recoiled position within the casing 10. A latching brake 18 is shown as being provided to releasable secure the tape 16 in any extended position. The tape 16 is of concavoconvex cross-section so that it assumes an extended condition when relaxed.

A tape hook 22 is provided at one end of the measuring tape 16 and is secured thereto by any suitable means such as rivets, not shown. The measuring tape 16 is extendible and retractable out of the tape casing 10 through a mouth 24 disposed adjacent the bottom wall of the casing. Tape 16 is formed of a suitable material, such as spring steel, and its innermost end is suitably connected to the recoil spring 14 so as to automatically be driven thereby into recoiled position in the casing 10 when the measuring tape is released from any extended position.

As so far described, the coilable rule is more fully disclosed and claimed in U.S. Pat. No. 3,214,836 which is assigned to the assignee of the present invention.

Figure 2:
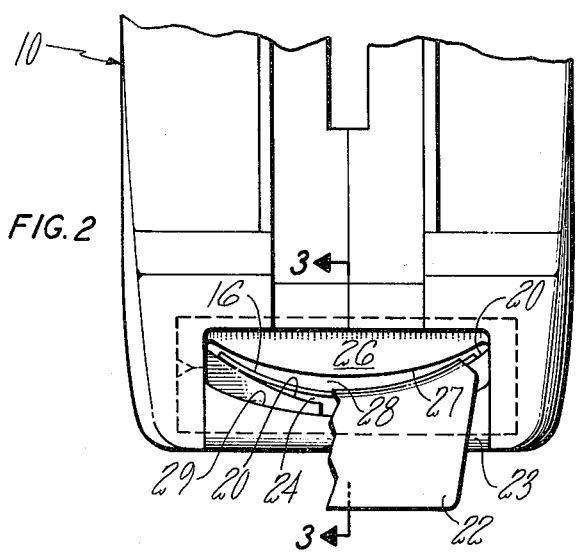
FIG. 2 is an enlarged fragmentary front elevational view of the coilable rule of FIG. 1.

In accordance with the present invention, a shaped tunnel within the casing adjacent the mouth 24 provides a path for the passage of the tape into and out of the casing 10. The shaped tunnel is formed by a pair of curved inclined upper surfaces of guides 20 which are molded integrally with the casing and extend from the side walls thereof and a decelerator in the form of a deceleration ring 26 is disposed between the guides 20 and the mouth 24 formed in the front wall of the casing. The deceleration ring provides similarly curved walls, or surfaces 27,29 to form with the guides 20 a crescent shaped tunnel aperature 28 through which the measuring tape 16 passes. The decelerating ring is formed of a suitable soft elastomeric material having a high coefficient of friction, such as a urethane elastomer or a soft vinyl or natural or synthetic rubber, preferably having a Shore A durometer hardness of about 70–75. As shown in FIG. 2, the inclined surfaces of guides 20 are disposed intermediate the curved walls 27,29 of deceleration ring 26 which are spaced so as to freely permit the extension of the tape 16 for making a measurement. The curvature of the cross-section of the tape 26 is slightly greater than that of curved walls 27,29 of the deceleration ring 26 and slightly less than that of the inclined surfaces of guides 20. Stated another way, the inclined surfaces of guides 20 are inclined so as to be tangent to a circle of greater curvature, or less radius, than that of the tape.

During recoil, the recoil spring 14 imparts an accelerating force on the blade while recoiling the same. It will be apparent that the force, which is stored in the blade as it is extended, is dissipated as the successive convolutions on the tape are recoiled and is concurrently converted, in part, to an increased momentum of the rotating coiled portion of the tape.

Due to the varying camber, gravity and other forces acting on the extended portion of the tape in a direction normal to its path of recoil, there occurs, during recoil, a deviation in the position of the tape from the central axis of the tunnel aperture 28 in the vertical and/or the lateral directions as viewed in FIG. 2. Since the tape is a resilient member and is of concavoconvex cross-section, any such deviation of the extended portion of the tape will cause it to oscillate to-and-fro vertically and/or laterally relative to such axis during recoil due to reaction forces with the rigid guides 20.

Where lateral to-and-fro oscillations have sufficient amplitude, the edges of the upper surface of the tape 16 will engage the convex surface 27 of the decelerating ring which, in addition to impeding further lateral movement of the tape, provides a friction force acting to retard the recoil speed of the tape. It will be apparent that such a frictional force increases as the amplitude of oscillation increases.

Figure 3:
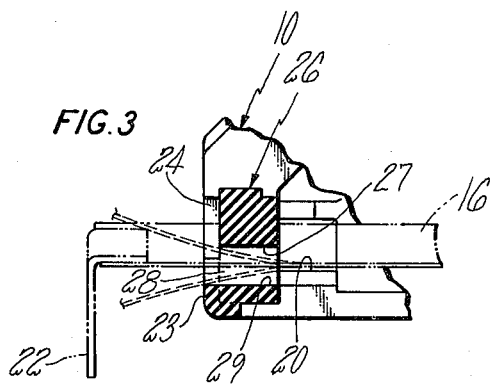
FIG. 3 is a fragmentary cross-sectional view taken along the lines 3-3 of FIG. 2.
Figure 5:
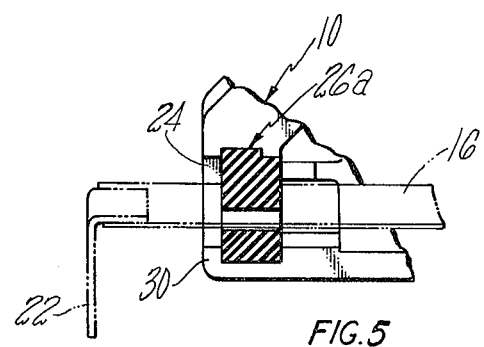
FIG. 5 is a fragmentary cross-sectional view similar to FIG. 3 of another preferred form of the deceleration ring utilized in this invention.

Similarly, vertical oscillations, or whipping, of the tape will cause, when the tape is deflected upwardly as indicated by the broken lines of FIG. 3, the tape to engage the convex upper surface 27 of the deceleration ring to limit the amplitude of the deflection of the tape and provide a frictional retarding force. When the tape deflects downwardly an amount sufficient to engage the top edge of the braking surface 29 of the deceleration ring, a decelerating force is also applied to the tape.

As the extended portion of the tape 16 diminishes in length, to say, about a foot or so, the extended portion of the blade becomes relatively stiffer as the mass and the moment arm of the center of mass of the extended portion of the tape decreases. At the same time, the amplitude of oscillations will, in a manner similar to that of a pendulum, tend to remain the same so that the tape extends at an increased angle with respect to the central axis of the tunnel aperture 28 as the extended portion of the tape shortens to apply an increasing retarding force as the tape approaches the termination of recoil. As a result, the momentum of the rotating coiled portion of the tape is absorbed and the speed at which the hook engages the casing is significantly reduced so that the shock impact imposed on the hook is minimized.

Figure 4:
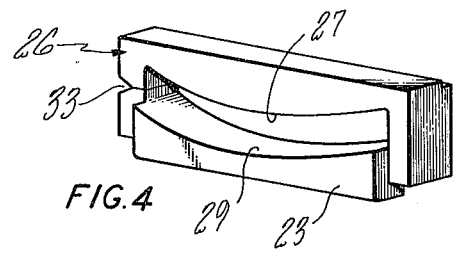
FIG. 4 is a perspective view of a deceleration ring utilized in the practice of this invention.

In the embodiment of FIGS. 1 and 4, the deceleration ring includes a forwardly extending portion 23 which is engaged by the hook 22 to cushion the termination of recoil.

The effectiveness of the deceleration ring 26 in absorbing the momentum of the rotating convolutions of the tape prior to the termination of recoil is such that the need to cushion the engagement of the hook 22 and casing 10 is obviated.

Accordingly, in the alternative preferred embodiment of FIG. 6, the front wall of the casing has a bottom portion 30 which projects in front of the deceleration ring 26a so that the hook, after being slowed down by the deceleration ring, comes to rest directly against the rigid casing 10.

As will be apprent to persons skilled in the art, various modifications, adaptations and variations of the foregoing specific disclosure can be made without departing from the teachings of the present invention.

I claim:

1. A coilable rule comprising a rigid casing having a mouth, a coilable measuring tape of concavo-convex cross-section, a recoil spring having one end secured to said casing and the other end secured to said tape, said spring being operable for the automatic recoil of said tape into said casing through said mouth, a stop at the free end of said tape for preventing the tape from being fully recoiled into the casing, a fixed guide disposed within the casing in alignment with said mouth for guiding the tape through said mouth, and a decelerator positioned between the front wall of the casing and said fixed guide and comprising a soft elastomeric member within the casing adjacent the path of travel of the tape which is frictionally engageable therewith during recoil as the tape oscillates as it approaches the end of recoil, said guide comprising a pair of generally inclined rigid surfaces which extend symmetrically inwardly from the side walls of said casing, said decelerator having upper and lower curved surfaces to define a crescent shaped tunnel aperture for the passage of the tape, said pair of rigid surfaces of the guide being horizontally positioned between the upper and lower surfaces of the guide to hold the blade out of contact with the decelerator except during the oscillation of the tape.

2. The device of claim 1 wherein the decelerator is provided with a forwardly projecting portion engageable with said stop at the end of recoil.

3. The device of claim 1 wherein the tape is of concavo-convex cross-section and the guide surfaces are inclined so as to be tangent with a circle of greater curvature than said tape.

4. The device of claim 3 wherein the curvature of the tape is greater than that of the upper and lower curved surfaces of the decelerator.

* * * * *

UNITED STATES PATENT OFFICE
CERTIFICATE OF CORRECTION

PATENT NO. : 3,905,114
DATED : September 16, 1975
INVENTOR(S) : Edward C. Rutty

It is certified that error appears in the above-identified patent and that said Letters Patent are hereby corrected as shown below:

In the Abstract, cancel the last sentence which reads: "Vertical flexures of the blade also causes a flattening of the blade to wedge the blade."

Column 1, line 24, after "having" insert --a--.

Column 2, line 24, cancel "aperature" and substitute therefor --aperture--.

In the claims, insert the following claim:
--5. The device of claim 1 wherein the decelerator has a Shore "A" hardness of about 70.--

Signed and Sealed this sixth Day of January 1976

[SEAL]

Attest:

RUTH C. MASON
Attesting Officer

C. MARSHALL DANN
Commissioner of Patents and Trademarks